Sept. 23, 1958      A. G. NEAVERSON      2,853,569
ELECTRICAL WARNING AND CONTROLLING DEVICE Filed Jan. 9, 1956      2 Sheets-Sheet 1

INVENTOR
Anthony Gordon Neaverson
BY
Lurch and Radice
ATTORNEY

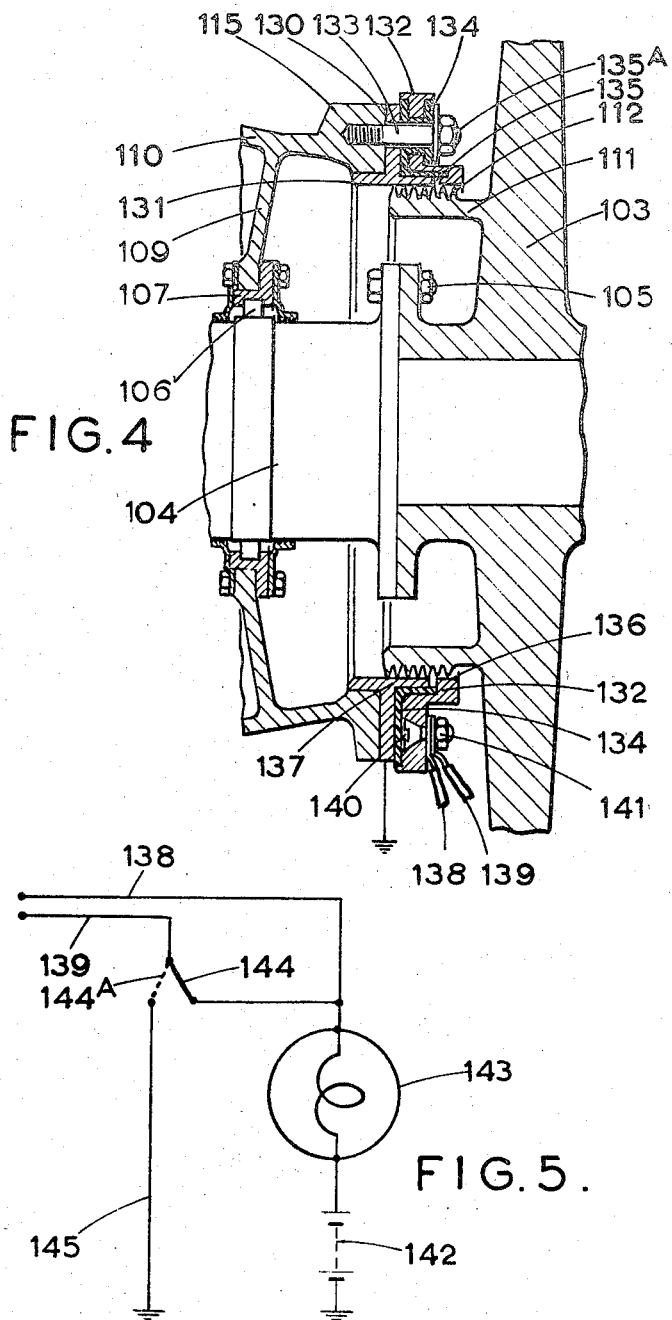

United States Patent Office 2,853,569
Patented Sept. 23, 1958

2,853,569

ELECTRICAL WARNING AND CONTROLLING DEVICE

Anthony Gordon Neaverson, Littleover, England, assignor to Rolls-Royce Limited, Derby, England, a British company Application January 9, 1956, Serial No. 558,165

Claims priority, application Great Britain January 14, 1955

7 Claims. (Cl. 200—61.41)

This invention is for warning and controlling devices herein called generally "protecting devices," for engines and particularly internal combustion turbine engines and has for its object to give a warning or to operate a control when a shaft or the like rotating member (herein for convenience called a shaft) becomes excessively unbalanced that is to say becomes subject to excessive unbalanced radial forces.

Such a condition may occur in the main shaft of an internal combustion turbine engine on a blade failure and may prove disastrous to the engine if its speed of rotation is not promptly reduced.

According to this invention there is provided means for sensing an excessive out of balance condition of the shaft assembly which comprises a rotating member of the shaft assembly an annular member co-operating therewith having at least two parts normally insulated from each other and at least one being normally substantially out of contact with the said rotating member but so that on the shaft reaching a state of excessive out of balance said rotating member bears on both said parts to connect them electrically and thus complete an electrical circuit to operate a protective device.

Preferably one of the said insulated members is at a greater distance from the rotating member of the shaft assembly than the other.

In an internal combustion turbine engine it is common to provide around the main shaft close fitting air seals. According to a feature of this invention the static member of the air seal carries parts normally electrically insulated from each other which are connected electrically through the rotating member of the air seal when the shaft reaches an excessive out of balance condition.

According to another feature of this invention a switch is included in the circuit by which the insulation between the insulated parts may be by-passed so that the proper functioning of the warning or controlling device can be tested or proved.

Two examples of this invention are illustrated in the accompanying drawings.

Figure 4 is a drawing corresponding to Figure 2 showing an alternative form of this invention and Figure 5 is a wiring diagram.

Figure 1:
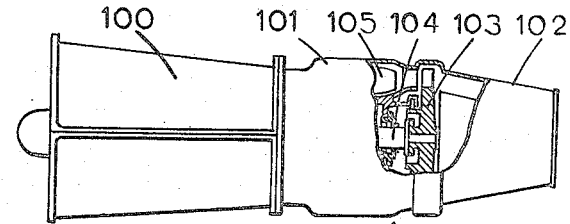
Figure 1 is a diagrammatic view of a jet-propulsion gas turbine engine with part of the casing at the downstream end of the combustion chamber cut away.
Figure 2:
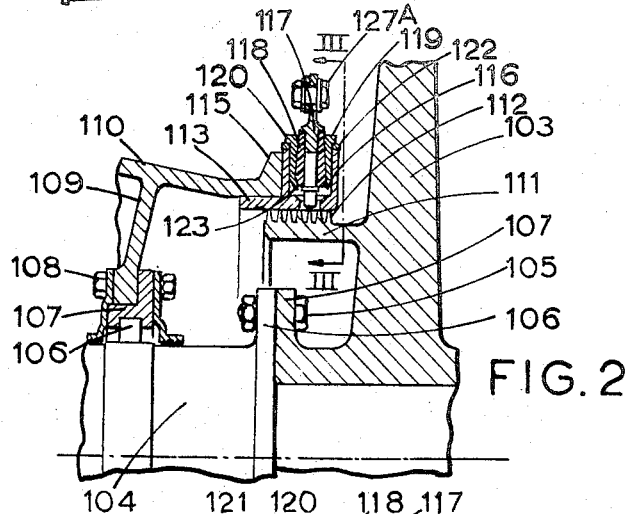
Figure 2 is a section of a part of the main shaft and turbine disc of the engine.
Figure 3:
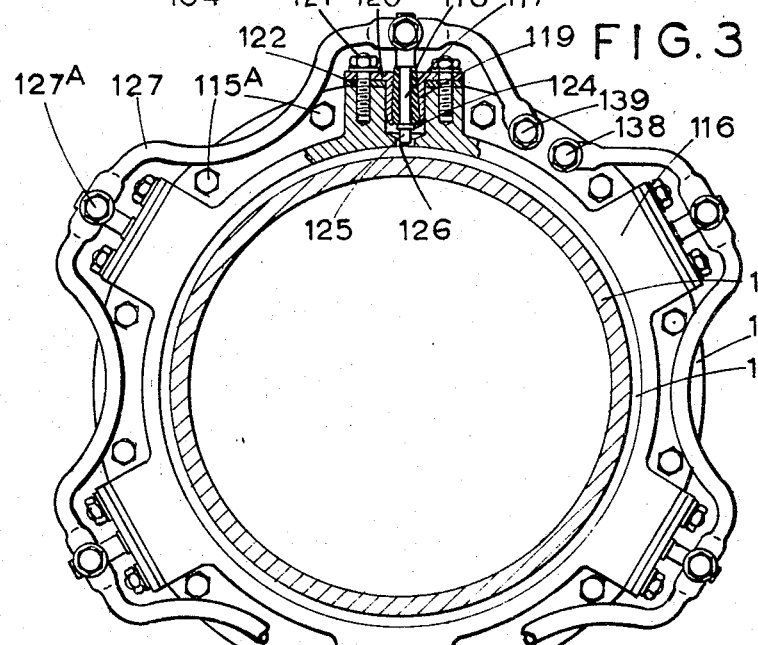
Figure 3 is a section on the line III—III of Figure 2.

Turning now to Figures 1, 2 and 3 the compressor casing of a gas turbine engine is shown at 100, the combustion equipment casing being shown at 101 and the turbine exhaust casing at 102. The turbine disc 103 is mounted on a shaft 104 and is driven by the heated gases leaving the combustion chambers 105. The turbine disc 103 is mounted on shaft 104 by bolts 105 securing together flanges 106 and 107 on the end of the shaft and on the turbine disc respectively.

The shaft 104 is mounted in roller bearing 106, the outer race 107 of which is secured by bolts 108 to an annular flange 109 forming the bearing housing and being part of the fixed structure 110. Turbine disc 103 carries an annular flange 111 on the outer perimeter of which are circumferentially-extending radial ribs 112 which form the rotating member of an air seal.

Into the open cylindrical end of the structure 110 is spigoted a ring member 113 having a radially-extending flange 114 by which it is secured to a flange 115 on the said structure by set screws 115A.

Formed integral with ring 113 are six radially-extending hollow bosses 116. Into each of these hollow bosses is fitted a probe member consisting of a metal pin 117 fitted into a ceramic insulator 118 in turn fitted into a metal sleeve 119. This sleeve has an annular flange 120 by which it is secured to the boss 116 by set screws 121, a washer 122 being inserted between the flange and boss. The end of the metal sleeve 119 is peened over the ceramic insulator 118 as shown at 123 and this ceramic insulator is tapered as shown so that pressure on the pin 117 cannot cause the insulator to move outward. A flange 124 on the pin abuts against the end of the ceramic insulator which resists outward pressure on the pin.

The inner end of the pin shown at 125 lies within a hole 126 through the wall of the ring member 113 and terminates a small distance, say 0.010 inch radially outwards of the inner periphery of ring member 113 to be normally just out of contact with one of the ribs 112. The position of the pin can be adjusted by selection of the thickness of the washer 122.

At their outer ends pins 117 are connected to bus bar 127 by bolts 127A. This bus bar terminates at points 138 and 139 which are connected to the warning circuit by leads not shown. Ring 113 is earthed through the engine carcase to complete the electrical circuit.

The ribs 112 will be out of contact with the probe pins 117 on normal rotation of shaft 104, turbine disc 103 and flange 111. If, however, an excessive out of balance condition of the shaft occurs due say to the shedding of a turbine blade, the rubbing between these ribs 111 and ring member 113 will bring one of the former into contact with the probe members thus completing the circuit through the bus bar, probe pins and ring 113 back to earth. This will cause the operation of the protective device which may for example be a warning lamp in the pilot's cabin or a cut-out to close down the engine. A light rub of one of the ribs against the probe members may occur under normal running conditions if the inner ends of the probes lie flush with the inner periphery of ring 113, but this will not be sufficient to operate the warning lamp or other protective device.

In the example shown in Figure 4 the static portion of the air seal which co-operates with the ribs 112 is made up of a ring member 130 which is spigoted into the end 115 of the bearing housing 110 as shown at 131. Ring 130 is also spigoted into a second ring member 132, both rings being secured to the end 115 of the bearing housing by studs 133 and nuts 133A.

Between the two rings 130 and 132 and between ring 132 and studs 133 is a moulded insulator 134. The insulator is moulded to ring 132 and then ground to the size required. It will be seen that the ring 132 is completely insulated from ring 130 by the insulator 134 and at its inner perimeter by an air gap 135. It will also be seen that the inner perimeter 136 of ring 132 is at a greater radial distance from the shaft axis than is the inner perimeter 137 of the ring 130. The inner perimeter 137 of ring 130 will normally be in contact with the ribs 112 but the perimeter 136 of ring 132 will be normally out of contact with these ribs.

Ring 132 is connected to the warning circuit by means of two leads 138 and 139 which are connected to the ring by means of a countersunk screw 140 and nut 141. Ring 130 is connected to earth through the carcase of the engine.

As long as shaft 102 rotates normally the ring 132 will remain out of contact with the ribs 112. Ring 132 will be insulated therefore from the body of the engine. When a state of excessive out of balance arises the ribs 112 will start to rub on both rings 130 and 132, bridging the insulation 134 and air gap 135 and completing the electrical circuit.

A wiring diagram is shown in Figure 5. The source of electrical energy conventionally illustrated at 142 as a battery is connected through a warning lamp 143 to the two leads 138 and 139 which are taken as shown to the screw 140 in Figure 4 or to the two points 138 and 139 in Figure 3. As long as neither of these leads is connected to earth, the lamp circuit will not be completed. As soon as they are so connected the circuit will be completed, and the lamp lit and this will occur when the out of balance condition of the shaft arises and the insulation in either embodiment is bridged as described.

In order to test the proper functioning of the apparatus a switch 144 is incorporated in lead 139. When this is in the position as shown in full lines in Figure 5 the apparatus will function as above described. If, however, the switch is thrown over to the position shown in dotted lines at 144A a connection will be made back to earth through lead 145. The lamp circuit will then be completed and its proper functioning ascertainable.

What I claim is:

1. In a gas turbine engine, means for sensing an excessive out-of-balance condition of the rotor assembly comprising; a rotating member of said assembly, a stationary annular member cooperating closely therewith, insulating means, contact means carried by said insulating means from said stationary member to be normally substantially out of contact but to contact said rotating member when an excessive out-of-balance condition of the rotor occurs, an electrical circuit having said stationary member and said contact means connected therein such that normally the circuit is broken by said insulating means and is completed by said rotary means contacting said contact means and annular member when an excessive out-of-balance condition occurs and means in said circuit, to give a warning of such conditions, the annular member being closer to the rotating member than is the contact means, whereby said electrical circuit will be completed only when considerable out-of-balance contact has occurred between the rotating member and the annular member.

2. Means as claimed in claim 1 in which there are provided two stationary ring members around the rotating member normally electrically insulated from each other one being at greater radial distance from the rotating member than the other and out of contact with the said rotating member, but located so that when the rotating member reaches a condition of excessive out of balance it will rub on said ring member and electrically connect the two rings to complete an electrical circuit through them.

3. Means as claimed in claim 1 in which there are associated with the rotating member of the assembly a stationary annular member incorporating a plurality of probes radially arranged with reference to the rotating member and normally insulated from said annular member and positioned so that on the rotor assembly reaching a condition of excessive out of balance the rotating member will bear on the probes and complete the electrical circuit.

4. Means as claimed in claim 3 in which the probes are mounted in pockets in the said annular member.

5. Means as claimed in claim 4 in which the probes are insulated by an air gap at the inner ends and elsewhere by ceramic insulators.

6. In a gas turbine engine of the type described, in combination, means for sensing an excessive out-of-balance condition of the rotor assembly comprising an air seal between the assembly and a static portion of the engine, in which the static member of the air seal carries a part normally electrically insulated from it and means on the rotating member of the air seal adapted to engage and place this part in electrical connection with the said static member when the assembly reaches an excessive out-of-balance condition, said static member being closer to the rotor assembly than is said part whereby substantial out-of-balance contact is needed to connect the part and static member, and an alarm circuit connected between said part and static member.

7. Means as claimed in claim 6 for the main shaft of a gas turbine engine in which the rotating member of the seal is carried by a turbine disc and the stationary member carrying the parts normally insulated from each other is carried by a shaft bearing housing.

References Cited in the file of this patent

UNITED STATES PATENTS

| | | |
|---|---|---|
| 893,865 | Ormiston et al. | July 21, 1908 |
| 1,001,152 | Lawrence | Aug. 22, 1911 |
| 2,794,136 | Kalikow et al. | May 28, 1957 |